United States Patent [19]
Krellenstein

[11] Patent Number: 5,924,090
[45] Date of Patent: Jul. 13, 1999

[54] METHOD AND APPARATUS FOR SEARCHING A DATABASE OF RECORDS

[75] Inventor: Marc F. Krellenstein, Chestnut Hill, Mass.

[73] Assignee: Northern Light Technology LLC, Cambridge, Mass.

[21] Appl. No.: 08/846,850

[22] Filed: May 1, 1997

[51] Int. Cl.$^6$ .................................................. G06F 17/30
[52] U.S. Cl. ..................... 707/5; 707/3; 707/4; 707/104
[58] Field of Search ................................. 707/1, 3, 4, 5, 707/104

[56] References Cited

U.S. PATENT DOCUMENTS

| | | | |
|---|---|---|---|
| 5,463,773 | 10/1995 | Sakakibara et al. | 395/600 |
| 5,640,553 | 6/1997 | Schultz | 707/5 |
| 5,659,742 | 8/1997 | Beattie et al. | 707/104 |
| 5,675,788 | 10/1997 | Husick et al. | 707/104 |
| 5,717,914 | 2/1998 | Husick et al. | 707/5 |
| 5,721,902 | 2/1998 | Schultz | 707/4 |
| 5,737,734 | 4/1998 | Schultz | 707/5 |
| 5,742,816 | 4/1998 | Barr et al. | 707/104 |
| 5,754,939 | 5/1998 | Herz et al. | 455/4.2 |

OTHER PUBLICATIONS

Meadow, Charles T., *Text Information Retrieval System*, Academic Press, San Diego, CA 1992 (5 pages).
Gallant, Stephen I., *Neural Network Learning and Expert Systems*, 2nd Ed., The MIT Press, Cambridge, MA 1994 (5 pages).
Botafogo, Rodrigo A., "Cluster Analysis for Hypertext Systems," *ACM–SIGIR*'93–Jun. 1993, pp. 116–124.
Iwayama, Makoto and Tokunaga, Takenobu, "Cluster–Based Text Categorization: A Comparison of Category Search Strategies," *ACM–SIGIR*'95 Seattle, WA 1995, pp. 273–279.
"Star/Web" Offers Database Searches Via Web Browsers Imaging Update vol. 7, Issue: 2, IAC Newsletter Collection, Feb 1, 1996.
Power Your Search with A Fleet of Engines, John Eckhouse, Home PC, Issue: 409, p: 133, Sep. 1, 1997.
Infoseek Gets Patent For Novel Search Engine Technique, Jean Rowan, San Antonio business Journal, vol: 11, p: 16, Oct. 31, 1997.
Data Control Alternative For VB—Sybase, Sheridan offer Replacements For Link Between Active X Database, from Controls, Andy Feibus, Information Week, Issue: 658, p: AD10, Nov. 24, 1997.

(List continued on next page.)

*Primary Examiner*—Wayne Amsbury
*Assistant Examiner*—Shahid Alam
*Attorney, Agent, or Firm*—Testa, Hurwitz & Thibeault, LLP

[57] ABSTRACT

A method and search apparatus for searching a database of records organizes results of the search into a set of most relevant categories enabling a user to obtain with a few mouse clicks only those records that are most relevant. In response to a search instruction from the user, the search apparatus searches the database, which can include Internet records and premium content records, to generate a search result list corresponding to a selected set of the records. The search apparatus processes the search result list to dynamically create a set of search result categories. Each search result category is associated with a subset of the records within the search result list having one or more common characteristics. The categories can be displayed as a plurality of folders on the user's display. For the foregoing categorization method and apparatus to work, each record within the database is classified according to various meta-data attributes (e.g., subject, type, source, and language characteristics). Because such a task is too much to do manually, substantially all of the records are automatically classified by a classification system into the proper categories. The classification system automatically determines the various meta-data attributes when such attributes are not editorially available from source.

23 Claims, 5 Drawing Sheets

OTHER PUBLICATIONS

Refining The Internet In '97. (database vendors and search engines refine their services), Greg R. Notess, Database vol: v20, Issue: n6, Dec. 1, 1997.

Weiss, R. Et al., "HyPursuit: A Hierarchical Network Search Engine that Exploits Content–Link Hypertext Clustering," *Hypertext '96, 7th.*ACM Conference on Hypertext, Washington, Mar. 16–20, 1996, No. Conf. 7, Mar. 16, 1996, pp. 180–193, XP000724328.

Wang Baldonado, M. Et al., "Sensemarker: An Information–Exploration Interface Supporting the Contextual Evolution of a User's Interests," CHI 97. *Human Factors in Computer Systems,* Atlanta, Mar. 22–27, 1997. Mar. 22, 1997, pp. 11–18, XP000697112.

Baldazo, R., "Navigating with a Web Compass," vol. 21, No. 3, Mar. 1, 1996, pp. 97–98, XP000600179.

METHOD AND APPARATUS FOR SEARCHING A DATABASE OF RECORDS

FIELD OF THE INVENTION

The invention relates generally to a method and apparatus for searching a database of records. More particularly, the invention relates to a method and search apparatus for searching a database comprising both Internet and premium content information.

BACKGROUND OF THE INVENTION

The Internet attracts millions of users every day. It has been estimated that the number of Internet users would grow from 10 million at the end of 1995 to 170 million by the year 2000. The primary attraction to the Internet is the promise of huge quantities of available information on any imaginable topic of interest. Research has shown that the primary uses of the Internet by users include searching for information and browsing (a form of searching) for information.

Several companies offer search services to assist users in searching the massive, rapidly growing, and infinitely distributed data on the Internet. A large number of Internet users use a search service several times a week, and the top twenty percent of Internet users use a search engine several times a day.

The Internet, however, is not without its shortcomings. While there are 250 gigabytes of textual information on the Internet accessible to the public, many Internet users are thwarted in their quest for information in the following ways: (1) quality information is often not on the Internet; (2) quality information exists but is dispersed across proprietary subscription-based sites; (3) search services produce too much or too little information; and (4) search services do not anticipate users' requests.

The Internet is an excellent source of the type of information found in product brochures. However, the Internet is a remarkably poor source of editorial information, reference information and commentary. One reason for this impediment is that quality information (i.e., premium content) is most often created and provided by companies who are compensated for the information (i.e., premium content owners). The tradition of no cost information on the Internet has inhibited premium content owner from making their information available via the Internet. Another reason has been the substantial financial and capital investment required to develop, market and maintain premium content on the Internet. Industry observers are unclear as to which business models will ultimately materialize to produce reasonable profits for premium content available on the Internet. As a result of these factors, the Internet is currently not considered a primary source of most recognized content on any topic.

Despite the foregoing reasons, some premium content owners have begun to make their information available on the Internet, typically in the form of subscription services. These services, however, have numerous problems and are therefore not always a good solution for Internet users.

One problem with subscription services is that a user must perform multiple searches and search multiple sites (often including multiple databases at sites) to obtain comprehensive information on the subject being searched. For a truly robust result, users often use a search engine, which can return volumes of information from the Internet. With no easy way to consolidate the returned information, users find the process too cumbersome and time consuming to be worthwhile. Another problem is that users can incur high costs in signing up for multiple subscription services to satisfy their needs in each topic area of interest. While users typically have varying interests, many resist signing up for multiple subscriptions on multiple topics. Yet another problem is that users are required to anticipate their desire to query on a particular topic in order to have all of the necessary subscriptions in advance. In reality, many user information interests are ad hoc and of short duration. Subscription services cannot satisfy this type of user information need.

When a user accesses one of the leading search engines, the search can produce hundreds, even thousands, of hits (i.e., records). For example, the Alta Vista™ search engine returns hundreds of thousands of hits in response to a search under the topic "windows." This deluge of information is often just too much to review, cull, and select. This problem is exacerbated by the failure of the search engine to group the hits in the search result list in any meaningful way. In the above example, Windows™ 95 software product information would be included along with architectural windows and personal pages on the search result list. Also, many of the leading search engines view each html page as an independent hit, so a one-hundred page Web site can produce one-hundred hits on the search result list. To address this problem, some search engines do group hits by web site.

Many leading search engines use primitive relevance ranking routines that result in search result lists with little or no relevance ranking. Poorly ranked search result lists are a significant problem for consumers. If a search produces one-hundred hits, the user must browse through twenty screens of information to see find the most interesting information. It has been shown most users give up after the first few screens. Thus, if highly relevant information is buried in a later screen, most users never know and conclude that the search was a failure.

Two of the leading search engines, Excite™ and Yahoo™, manually classify and index the Internet. This approach produces high quality indexes and proper classification of Web sites in the directory structure. However, the editorial staffs of these companies find themselves in a losing race with the growth of the Internet. Even with staffs of hundreds of editors, these companies cannot visit enough Web sites and cannot revisit each site every time the site changes. Consequently, these companies are incapable of covering a large percentage of the Internet. As a result, searches using these search engines can often return "too little" useful information.

SUMMARY OF THE INVENTION

The present invention features a method and apparatus for searching a database which can include Internet and premium content records. The invention provides users with access to the wealth of information on the Internet and to premium content information not on the Internet. The invention uses sophisticated categorization methods along with detailed relevancy criteria to provide a meaningful search result list in the form of a set of search result categories. The user is presented with a small number of categories along with a list of the most relevant records. Each category can include narrower categories and/or a list of the most relevant records. By organizing the search list results into a hierarchy, users can rapidly focus the search to those few records of interest without being overwhelmed by the results.

In one aspect, the invention features a method for searching a database of records. The database can include Internet and premium content records. In response to a search instruction from a user, the database is searched and a search result list which includes a selected set of the records is generated. A portion of the search result list is processed to dynamically create a set of search result categories. By way of example, the portion of the search result list can be the first two-hundred (or one-hundred) most relevant records within the selected set of records. Each search result category is associated with a subset of the records within the search result list.

The invention uses a categorization (or clustering) methodology for retrieving records stored in the database to compile the search result list. The methodology has three primary steps: identifying candidate categories, weighing candidate categories and displaying a set of search result categories selected from the candidate categories.

Each record within the search list can have associated subject, type, source and language characteristics. Common characteristics associated with the records are identified, and records having common characteristics are grouped into candidate categories. A list of candidate categories, being representative of possible search result categories, is compiled. Each candidate category is weighted as a function of the identified common characteristics of the records within that candidate category. One or more candidate categories are selected as a function of the identified common characteristics of the records. For example, about five to ten search result categories can be selected from the candidate categories. A graphical representation of the categories is provided for user display of the categories. The categories can be displayed as a plurality of folders on the user's display.

In another aspect, the invention features a search apparatus for searching a database of records. The database comprises a plurality of records, including Internet records and premium content records. The apparatus includes a search processor and a grouping processor. The grouping processor includes a record processor; a candidate generator; a weighing processor; and a display processor. Each of these elements is a software module. Alternatively, each element could possibly be a hardware module or a combined hardware/software module. The search processor receives search instructions from a user. Responsive to a search instruction, the search processor searches the database to generate a search result list which includes a selected set of the records. The grouping processor processes a portion of the search result list to dynamically create a set of search result categories. Each search result category is associated with a subset of the records in the search result list.

The apparatus performs a plurality of processing steps to dynamically create the search result categories. The record processor that identifies subject, type, source and language characteristics associated with each record within the search result list. The candidate generator identifies common characteristics associated with the records within the search result list and compiles a list of candidate categories. Each candidate category is representative of a possible search result category. The weighting processor weights each candidate category as a function of the identified common characteristics of the records within the candidate category. The display processor selects a plurality of search result categories corresponding to those candidate categories having the highest weight. The display processor provides a graphical representation of the search result categories for display on the user's monitor.

The invention provides an efficient method to view and navigate among large sets of records and offers advantages over long linear lists. The invention uses categorization to guide the user through a multi-step search process in a humane and satisfying way. A user can construct a complex query in small steps taken one at a time. Using the invention, a user can rapidly perform the search in a few steps without having to review long linear lists of records.

BRIEF DESCRIPTION OF THE DRAWINGS

These and other features of the invention are more fully described below in the detailed description and accompanying drawings of which the figures illustrate an apparatus and method for searching a database comprising both Internet and premium content information.

DETAILED DESCRIPTION

Figure 1:
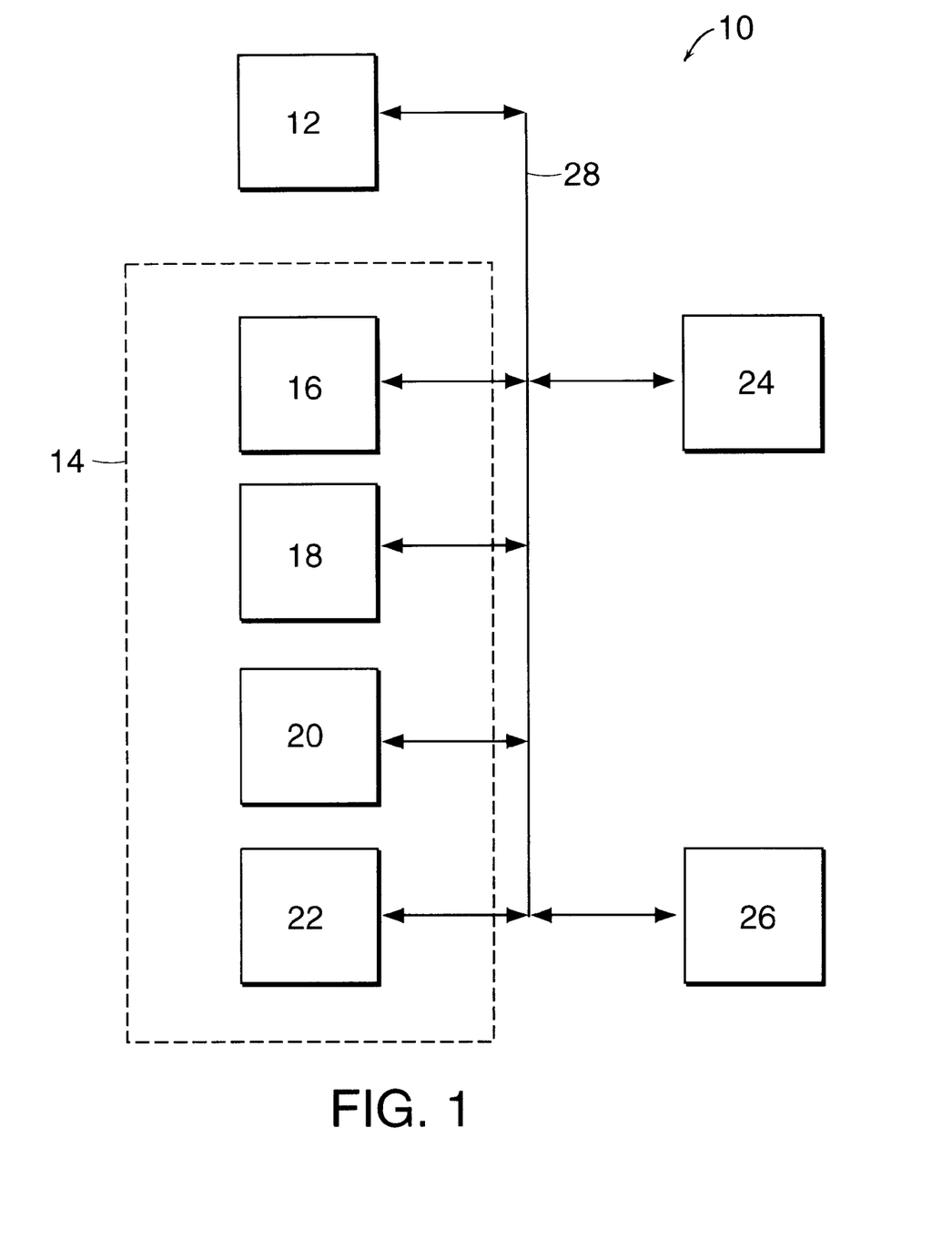
FIG. 1 is a block diagram illustrating the functional elements of a search apparatus incorporating the principles of the invention.

FIG. 1 is a block diagram illustrating the functional elements of a search apparatus incorporating the principles of the invention. The apparatus 10 includes a search processor 12 and a grouping processor 14. The grouping processor comprises a record processor 16, a candidate generator 18, a weighing processor 20, and a display processor 22. These elements are software modules and have been so identified merely to illustrate the functionality of the invention. The apparatus 10 communicates with a user 24 (i.e., a computer) and a database 26, which includes Internet and premium content records, via an I/O bus 28. The apparatus 10 is capable of communicating with a plurality of remotely located users over a wide area network (e.g., the Internet).

Figure 2:
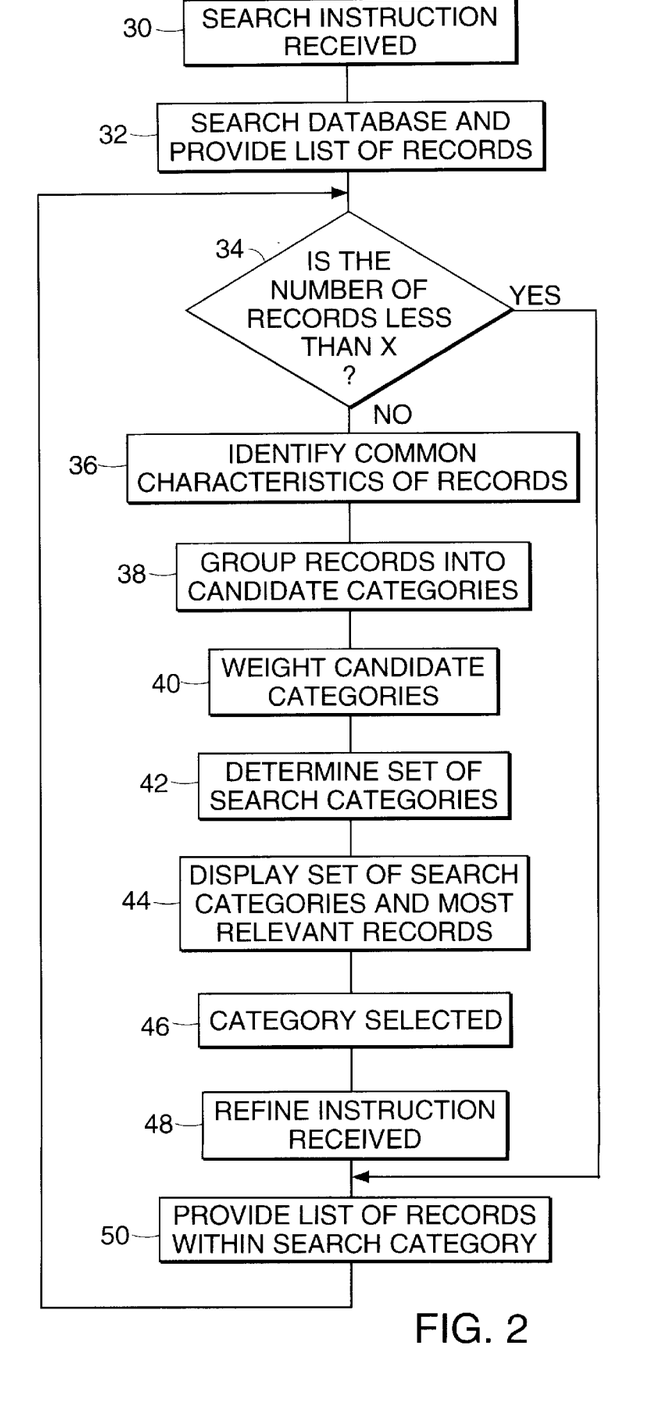
FIG. 2 is a flow chart illustrating the sequence of steps used by the search apparatus in performing a search in accordance with the invention.

FIG. 2 is a flow chart illustrating the sequence of steps used by the search apparatus in performing a search. With reference to FIGS. 1 and 2, the search processor 12 receives search instructions (i.e., a query) from a user 24 via the bus 28 (step 30). The search processor 12 searches the database 26 and generates a search result list corresponding to a selected set of the records (step 32). The selected set of records are ranked according to relevancy criteria. In one embodiment, the relevancy criteria for ranking the records can include the following rules:

1. If there are more "hits" (a word in a record matching a word in the search criteria), the record ranks higher;
2. If the query term phrase is a hit versus the words separately being hits, the record ranks higher;
3. If the capitalization is the same as in the query term, the record ranks higher;
4. If the query term is in the title, the record ranks higher;
5. If the query term is in the abstract, the record ranks higher; and
6. If the query term is in the keywords, the record ranks higher.

If the number of records is less than a particular value (e.g., 20), the grouping processor 36 is bypassed (step 34). Otherwise, the grouping processor 14 processes a portion of the search result list to dynamically create a set of search result categories, wherein each search result category is associated with a subset of the records in the search result list. By way of example only, the portion of the search result list processed can be the first two-hundred (or one-hundred) most relevant records within the selected set of records.

The grouping processor 14 performs a plurality of processing steps to dynamically create the set of search result categories. The record processor 16 identifies various characteristics (e.g., subject, type, source and language) associated with each record in the search result list (step 36). The candidate generator 18 identifies common characteristics associated with the records in the search result list and compiles a list of candidate categories (step 38). The candidate generator 18 utilizes various rules, which are described below, to compile the list. The weighting processor 20 weights each candidate category as a function of the identified common characteristics of the records within the candidate category (step 40). Also, the weighting processor 20 utilizes various weighting rules, which are described below, to weight the candidate categories. The display processor 22 selects a plurality of search result categories (e.g., 5 to 10) corresponding to the candidate categories having the highest weight (step 42) and provides a graphical representation of the search result categories for display on the user's monitor (step 44). The search result categories can be displayed as a plurality of icons on the monitor (e.g. folders). When a particular search result category is selected by the user, the display processor also can provide a graphical representation of the number of records in the search result category, additional search result categories and a list of the most relevant records for display.

As noted above, the user can select a search result category (step 46) and view additional search result categories (if the number of records is greater than a particular value) along with the list of records included in that category. To narrow the search, the user can provide an additional search terms (i.e., a refine instruction) (step 48). Upon receiving the additional terms, the search processor 12 searches the database 26 and generates another search result list corresponding to a refined set of the records (step 50). Alternatively, the user can (effectively) refine the search simply by successively opening up additional search result categories.

Figure 3A:
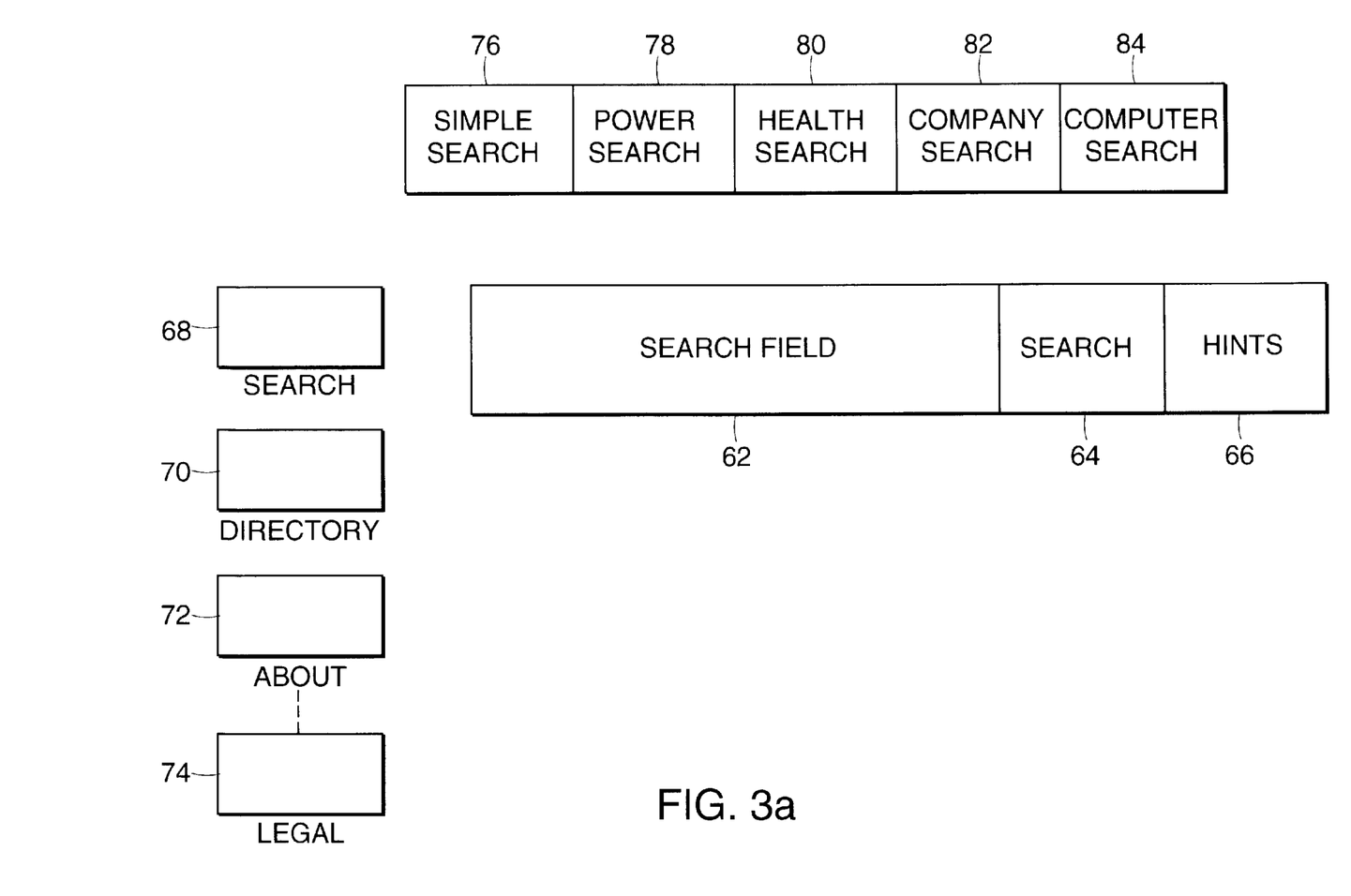
FIGS. 3A–3C are illustrations of a user's display during a search using the search apparatus.
Figure 3B:
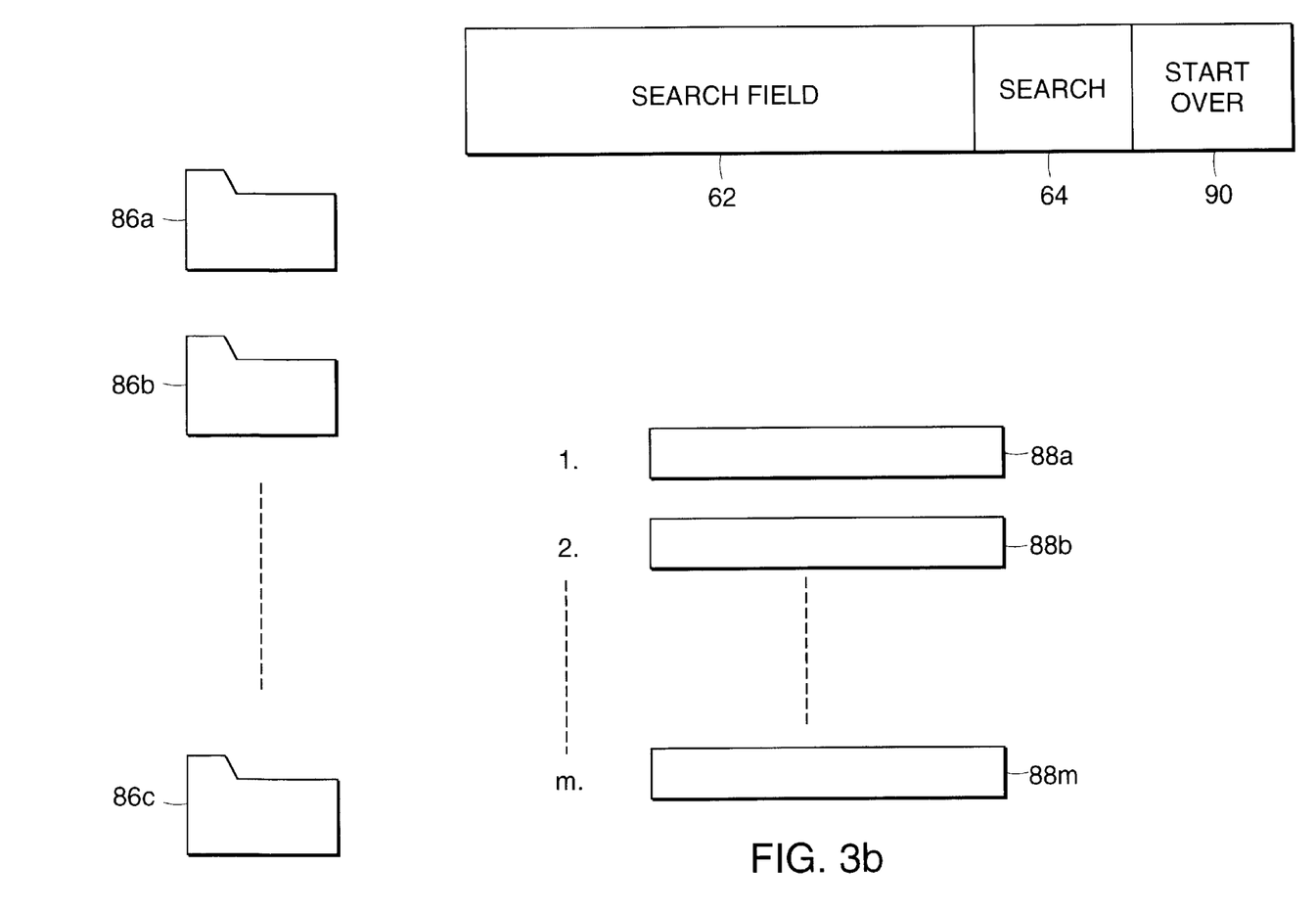
Figure 3C:
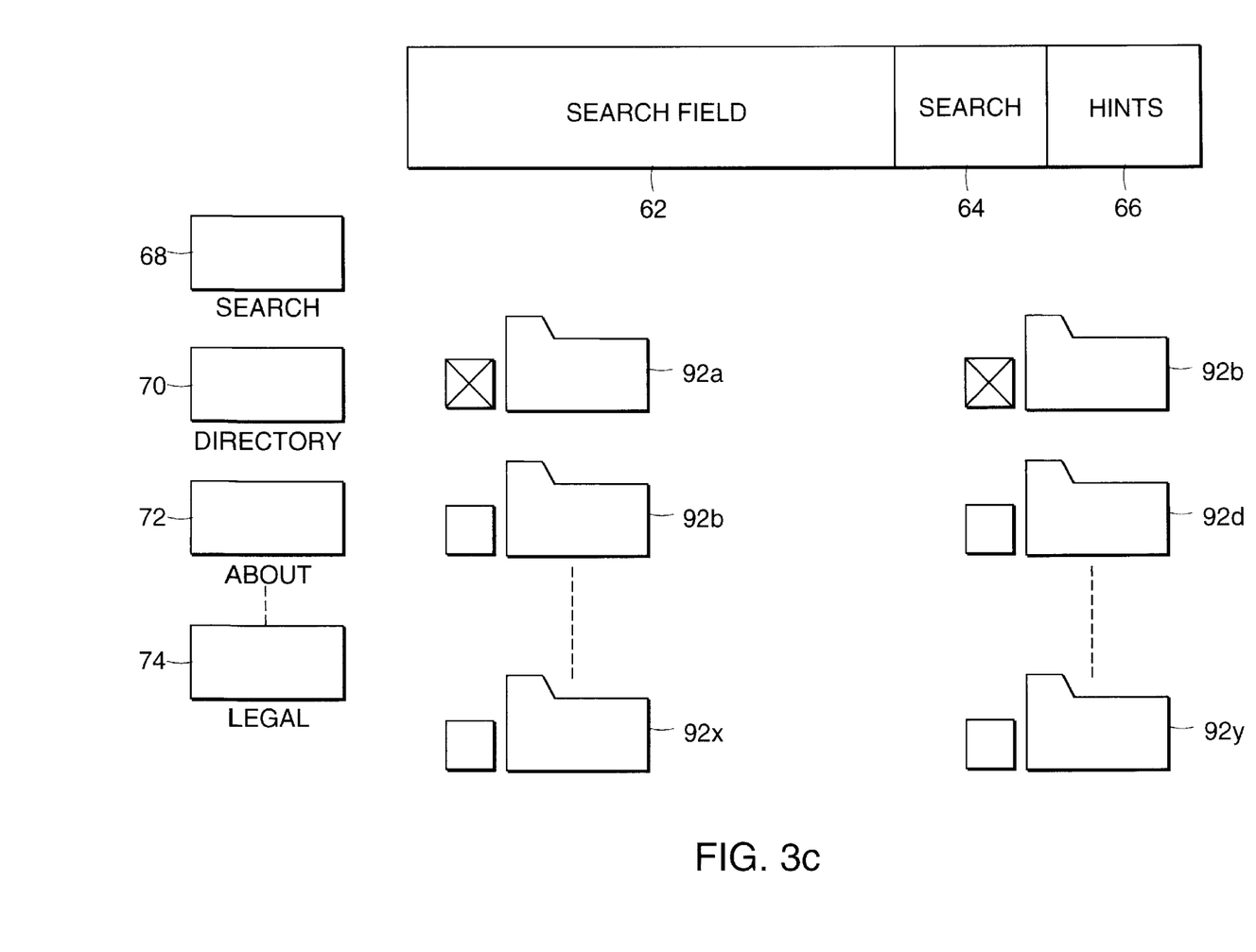

FIGS. 3A–3C are sample illustrations of a user's display during a search using the search apparatus 10. These illustrations are merely exemplary and provided solely for explanation purposes. Therefore, the layout of the various keys, buttons and icons is immaterial. With reference to FIGS. 3A–3C, the display 60 includes a search field 62 into which a user can enter search instructions and a search icon 64 for executing the search instructions. The display also includes a hints icon 66 for providing search tips, miscellaneous function icons (e.g., a search icon 68, directories icon 70, a support icon 72 and a legal icon 74) and search icons (e.g., simple search 76, power search 78, health search 80, company search 82 and computer search 84).

The user enters search instructions (i.e., a query) into the field 62 and selects the search icon 64 (see FIG. 3B). The search apparatus 10 searches the database 26 and dynamically creates a set of search result categories (86a–86n) along with a list of the most relevant records (88a–88m). Each search result category (86a–86n) includes a subject caption, and each record (88a–88m) includes a caption along with a "fee/free" indicator. The user can view a category by selecting its icon or can view a particular record by selecting its icon. Alternatively, the user can perform a new search by selecting the start over icon 90 or can refine the query by entering text into the search field 62 and selecting the search icon 64. If the user selects a category, the apparatus 10, creates another set of search result categories and another list of the most relevant records. The user can repeat this process, further narrowing the search with each iteration, until the number of relevant records drops to a predetermined threshold (e.g., 20). At that point, the apparatus 10 only provides the user with a list of the most relevant records.

The user can use a predetermined list of directories (92a–92y) to focus the searching process (see FIG. 3C). The user enters search instructions into the field 62, selects one or more directories (e.g., directories 92a, 92b) and selects the search icon 64 (see FIG. 3B). The search apparatus 10 searches the database 26, focusing on those records that satisfy the query and fall within the selected directories. The apparatus provides a set of search result categories and most relevant records which are limited to those directories.

The grouping processor executes a categorization algorithm to dynamically create the set of search result categories. The algorithm includes three primary steps: identifying candidate categories, weighting categories and displaying a plurality of categories with the highest weights. The rules have been organized around a target number of seven (+/−2) categories in the following embodiment, but are generally independent of that number.

One embodiment of the categorization algorithm employed by the grouping processor is presented logically hereinafter. It is noted that an actual implementation of the algorithm may omit steps, perform steps in parallel or arbitrarily. In describing the algorithm, the following terms are used. The term "nrecs" means the first 200 records of the total number of records on the search result list, or the total size of the result list, whichever number is smaller. The term nrecs refers interchangeably to that number of records or that group of records. The term "ncategories" means the number of desired categories (+/−2 categories). The term "internal domain ordering" means an ordering of domains that emphasizes the relevant differentiation capabilities of the domains. The ordering can be as follows: type; subject; source; and language. The term "user domain ordering" means an ordering of domains that emphasizes the user accessibility/apparent user value of the domains. The ordering can be as follows: subject; source; type; and language. The term "level" means the level in a domain hierarchy of the single value for that particular domain assigned to that category. Hierarchy levels are assumed to be numbered from 1 (all items, e.g., all subjects) through N (the lowest level of the hierarchy, with the normal 'top' level of 6 or so items being level 2).

In response to a query, the search processor searches the database and generates a search result list. The set of records in the list are ranked according to relevancy criteria described above. All subsequent processing is performed on nrecs. If nrecs is less than 20 (or, some other predetermined number), the only candidate category is the "all records" category, and the processor skips to category weighting (described below).

For all candidate generation rules, the set of available type, subject, language or source values is limited by any value or sub-trees of such value provided in the query (e.g., queries limited to a particular subject result in candidate categories that only include that subject or more specific subjects in that subject area). If no values for these fields are provided, the entire domains of these characteristics are available. It is assumed that any criteria specified for multiple fields are logically AND'd together in the query.

The grouping processor generates, as candidate categories, all type-subject combinations having more than 20% of nrecs and using all available nodes in the subject and type domains. The grouping processor generates, as candidate categories, all subject-only groupings and consolidations from all available nodes in the subject domain that have 20% or more of nrecs. The grouping processor generates, as candidate categories, all type-only groupings and consolidations from all available nodes in the type domain that have 20% or more of nrecs. The grouping processor generates, as a candidate category, any domain in the language hierarchy that contains more than 20% but less than 80% of nrecs. The grouping processor generates, as a candidate category, any web site that contains three or more records, or any other node in the source hierarchy that contains more than 20% of nrecs. The grouping processor generates, as a candidate category, any top-level node in the source hierarchy for which one has not already been generated. This provides at least one set of candidate categories which are exhaustive not only of nrecs but of the entire search result list. The grouping processor generates candidate categories with 20% or more of nrecs not already generated that consist of all pair-wise combinations of all available nodes of any two fields specified in the query (e.g., a query specifying language and source will have candidates generated for all language-source combinations with 20% or more of nrecs. Finally, the grouping processor eliminates any categories with a value of "Unknown" for any domain in the category.

Second, the algorithm weights categories. The weighting rules indicate weights are applied cumulatively to categories (i.e., the final weight of each category is the sum of all the weights received). One rule emphasizes the internal domain ordering and the level of precision within a domain. That rule provides that all categories receive a weight for each domain which is the product of the factor for that domain and the level of the value for that domain. The factors are as follows: type (10), subject (6), source (3) and language (1). Another rule emphasizes categories having a larger number of records. That rule provides that all categories receive a weight which is 20% of the percentage of nrecs contained in that category. Three rules emphasize the most relevant categories. The first rule provides that all categories receive a weight equal to ten times the number of records in the category that are among the top ranked five records of nrecs. The second rule provides that all categories receive a weight equal to five times the number of records found in the category that are among the second ranked five records of nrecs. The third rule provides that all categories receive a weight equal to two times the number of records found in the category that are among the eleventh through twentieth ranked records of nrecs.

Four weighting rules show spread in a domain, increasing overall coverage and minimizing duplication. The first rule provides that all categories containing a value at level two of the domain of that value, for which there are no categories for values below level two of that domain, receive a weight of 15. This applies for each domain contained within the category theme. The second rule provides that all categories containing a value at level three of its domain, for which there are no categories for values below level three of that domain, receive a weight 8. This applies for each domain contained within the category theme. The third rule provides that, if the ncategories with the highest weights do not exhaustively cover the values of any one of the domains, and there are two or fewer categories that can be added with values from a single domain to exhaustively represent that domain, add 25 to each of those two categories. If, however, there are more than two categories (in the same or a different domain) that this applies to, select the categories for which the sum of the two identified categories have the highest weight. In case of a tie, select based on the internal domain ordering. and, if still a tie, select randomly. The fourth rule provides that all categories that contain records, 70% or more of which are not found in other categories, receive a weight of 8. It is noted that other percentages and weighting values can be used.

Another rule emphasizes web site categories. That rule provides that all web site-only categories with 20% of more of nrecs receive a weight of 12. Yet another rule emphasizes themes specified within a query and provides that all categories containing a domain for which the user specified a value receive a weight of 10. Finally, a rule that emphasizes combination categories provides that all combination categories receive a weight of 8.

Third, the algorithm determines a plurality of search result categories from those candidate categories with the highest weights. First, the processor selects the candidate categories with the highest weight. In case of ties, the user domain ordering is used to select the categories. If the lowest or two lowest weighted categories in ncategories represent a significant drop from the next highest weighted category, the ncategories are reduced by one or two. If, however, the two highest weighted categories not already in ncategories are insignificantly lower in weight than the lowest category already in ncategories. the ncategories are increased by one or two. It is noted that other percentages and weighting values can be used.

In determining the name for each search result category, categories with combinations of domains (e.g., subject-type) are named with the value of each domain separated by a hyphen. The order of the two domains is determined by the user domain ordering. For each search result category, a count of the number of records in each category is displayed. Web site categories are named by the domain of the web site, which may be a hot link to the default home page of the site. Regardless of whether any of the displayed categories are pure or combination web site categories, all occurrences of individual records within the record list of any category, other than a web site or web site combination category, are replaced with the web site category that contains those records. For web site categories so embedded within a search results list that have three or fewer records, it is possible to show the records "in-line," i.e., the individual records themselves can be shown with the category name, eliminating the need to explicitly expand the category. Records within search result categories are displayed by default in relevancy order, or, at the user's option, in reverse date order (most recent first). Web site categories within record lists are ranked by the value of the highest ranked record in the web site.

The numerical percentages, the assigned weights and the detailed rules described above are exemplary and can change without departing from the spirit and scope of the invention.

For the categorization methodology to work, each record within the database, including Internet records and premium content records, is classified by subject, type, source, and language characteristics (i.e., meta-data attributes). In other embodiments, the records can be classified by additional meta-data attributes (e.g., level of difficulty or popularity), query-based attributes, proper names, and run-time document analysis characteristics. Because such a task is too much to do manually, the search apparatus auto-classifies substantially all of the records into the proper categories.

Every record is assigned one or more types (e.g., article, book review, letter) and a single source value (e.g., PC Week, personal web pages) via a mostly automatic process (completely automatic for Internet data), although there is some editorial assignment for certain premium content data. Also, every record is generally assigned one or more subjects (e.g., molecular biology) and languages (e.g., French) via a mostly automatic process (completely automatic for Internet data). Occasionally, a record is not assigned a subject and/or language. In such cases, the records are assigned a value of "unknown" for these particular metadata items (or attributes, or fields, or domains). In the case of subject, language and type (but not for source), it is possible for a record to have more than one value (e.g., because it really addresses two or more different subject areas, or because it contains text in more than one language).

Further, all of the values in these domains are arranged hierarchically (e.g., "molecular biology" belongs to "biology", and "book reviews" belongs to "reviews"). Although records are automatically or manually classified to only one (or perhaps two or more) fairly specific values for a given domain (e.g., "book review" for type, "molecular biology" for subject), they inherit all the values that are higher than those values in their respective domain hierarchies. For example, a record classified to "molecular biology" is also given the subject of "biology" (the parent of molecular biology) and the subject of "science" (which is the parent of biology). This can result in additional 5 or 6 classification values for that record. The top levels of each hierarchy are fairly small, e.g., about six subject areas for the subject domain (including humanities and society, business, etc.), each of which are divided into three or four more, making 18 at level 2, each of which are divided into about 35, making about 600 at level 3, etc.

A classification system has been developed for automatically determining the four data attributes (i.e., subject, type, language and source) when such attributes are not editorially available from the publisher or record source. The classification systems includes two main components: (1) a query-based classification program; and (2) set of individual programs.

The query-based classification program efficiently performs classification for selected attributes and attribute values, including 20,000+ subject terms. One query is required for each attribute and attribute value (e.g., attribute=subject, attribute value=biochemistry). The queries are executed against all of the records, and classification scores representing the strength of the match are computed for each record and query. Records are then classified to the two or three queries/attribute values for which that record has the highest classification score.

The query-based classification program draws on the following sub-components: (1) a classification language for specifying classification queries; (2) a means of and sources for automatically producing classification queries used by the program; and (3) a number of manually constructed classification queries used by the program.

The means of and sources for automatically producing classification queries generates queries about 5 lines long. Each query is produced by analyzing an exemplar or model record for that attribute value (e.g., an encyclopedia article on biochemistry) and automatically extracting the most significant terms for the record. The resulting 'query' is used to match and retrieve other similar records (i.e., classifiable to the same value). Term significance is determined both by how frequent the term is within the record (i.e., more frequent equals more significant) and how infrequent it is in the particular body of exemplar records being used, e.g., the encyclopedia as a whole (i.e., less frequent equals more significant). Exactly what values of frequency/infrequency to use is empirically determined and set for each particular source of exemplar records. Multiple sources can be used. A number of related program tools have also been developed (e.g., for automatically matching encyclopedia articles to terms in the subject hierarchy).

The number of manually constructed classification queries is as follows: about 2,000 such subject queries; about 50 manual type queries; and about 6 manual language queries. Manual queries average about 15 lines in length, except for language queries, which are considerably longer.

The second component of the classification system is a set of individual programs and a higher level controlling program which are used to classify data to certain particular values (e.g., recipe, or "personal web page") of one of the data attributes ("type" in the case of recipe, "source" in the case of personal pages) when the query-based approach is considered inadequate. These programs are comprised of several thousand lines of Perl. These programs look not only for the presence of certain words but for formatting cues (e.g., the particular format of a record of type recipe, or of type interview). There is also a set of testing tools for evaluating the results of these classifications.

A classification database creates and maintains the data taxonomies, hierarchies, crossreferences and associated classification queries. The database includes a multi-user classification editor, and a means to generate reports and data files needed by other system components (e.g., the search engine) and is implemented using Microsoft Access, Microsoft forms, Data Access Objects, SQL and Visual Basic. The database includes approximately 40 tables, 15 forms, 25 reports and 5,000 lines of Visual Basic, and it produces 12 intermediate files for other parts of the system.

Equivalents

While the invention has been particularly shown and described with reference to specific preferred embodiments, it should be understood by those skilled in the art that various changes in form and detail may be made therein without departing from the spirit and scope of the invention as defined by the appended claims.

I claim:

1. A method for searching a database of records, comprising:

searching the database, in response to a search instruction, to generate a search result list which includes a selected set of the records;

processing at least a portion of the search result list to dynamically (i) identify common characteristics associated with the records within the search result list, (ii) group records in the search result list having common characteristics into candidate categories, and (iii) compile a list of candidate categories, each candidate category being representative of a possible search result category; and weighting each candidate category as a function of the identified common characteristics of the records within the candidate category.

2. A method according to claim 1 further comprising ranking the records within the search results list according to preselected relevancy criteria.

3. A method according to claim 1 further comprising identifying subject, type, source and language characteristics associated with each record within the search result list.

4. A method according to claim 3 further comprising grouping the search result categories in response to a user-selected value for one of the characteristics.

5. A method according to claim 1 further comprising selecting candidate categories as a function of the identified common characteristics of the records.

6. A method according to claim 5 further comprising selecting between about five to ten search result categories from the candidate categories.

7. A method according to claim 1 wherein the database includes Internet records and premium content records.

8. A method according to claim 1 further comprising providing a graphical representation of the categories.

9. A method according to claim 1 further comprising identifying meta-data characteristics associated with records within the search result list.

10. A search apparatus for searching a database of records, comprising
- a search processor, responsive to a search instruction, for searching the database to generate a search result list which includes a selected set of the records;
- a grouping processor for processing at least a portion of the search result list to dynamically (i) identify common characteristics associated with the records within the search result list, (ii) group records having common characteristics into candidate categories, (iii) compile a list of candidate categories, each candidate category being representative of a possible search result category; and
- a weighting processor for weighting each candidate category as a function of the identified common characteristics of the records within the candidate category.

11. An apparatus according to claim 10 further comprising means for ranking the records within the search result list according to preselected relevancy criteria.

12. An apparatus according to claim 11 further comprising means for grouping the records within the search result list in response to a user-selected value for one of the characteristics.

13. An apparatus according to claim 10 further comprising a record processor for identifying subject, type, source and language characteristics associated with each record within the search result list.

14. An apparatus according to claim 13 further comprising means for ranking the identified common characteristics of the records into a hierarchical order.

15. An apparatus according to claim 10 further comprising means for selecting between about five to ten search result categories from the candidate categories.

16. An apparatus according to claim 10 further comprising a display processor for providing a graphical representation of the categories.

17. An apparatus according to claim 10 further comprising means for generating, as a function of one of the categories, a refine instruction being representative of an additional instruction for searching the database for records associated with the category and the additional instruction.

18. An apparatus according to claim 10 wherein the database includes Internet records and premium content records.

19. A search apparatus comprising:
- a database for storing a plurality of records, including Internet records and premium content records;
- a search processor for searching the database, in response to a search instruction from a user, to generate a search result list which includes a selected set of the records;
- a grouping processor for processing at least a portion of the search result list to dynamically (i) identify common characteristics associated with the records within the search result list, (ii) group records having common characteristics into candidate categories, (iii) compile a list of candidate categories, each candidate category being representative of a possible search result category;
- a weighting processor for weighting each candidate category as a function of the identified common characteristics of the records within the candidate category; and
- a display processor for providing a graphical representation of the categories to the user.

20. A method for automatically classifying a database of records, comprising:
- executing a query for each attribute value associated with each of a plurality of query attributes against each of talk records in the database;
- selectively matching the format of at least one of the records to each of a plurality of attribute formats;
- determining a classification score which represents the relative strength of the match for each query and each record;
- determining a classification score which represents the relative strength of the match for each attribute formats and at least one of the records; and
- classifying each record under selected attribute values for each attribute for which the record has highest classification scores.

21. The method of claim 20 further comprising arranging the attribute values for each attribute hierarchically.

22. A method for searching a database of records, comprising:
- searching the database, in response to a search instruction, to generate a search result list which includes a selected set of the records;
- processing at least a portion of the search result list to dynamically (i) group records in the search result list into candidate categories based on identified common characteristics associated with such records, and (ii) compile a list of candidate categories, each candidate category being representative of a possible search result category; and
- weighting each candidate category as a function of characteristics of the records within the candidate category.

23. The method of claim 22 wherein the weighting step further comprises weighting each candidate category as a function of the identified common characteristics of the records within the candidate category.

* * * * *